INVENTORS
KENNETH B. BENSON
FRANK DAVIDOFF
BY
Brumbaugh, Free, Graves & Donohue
ATTORNEYS INVENTORS
KENNETH B. BENSON
FRANK DAVIDOFF
BY
Brumbaugh, Free, Graves & Donohue
ATTORNEYS INVENTORS
KENNETH B. BENSON
FRANK DAVIDOFF
BY
Brumbaugh, Free, Graves & Donohue
ATTORNEYS INVENTORS
KENNETH B. BENSON
FRANK DAVIDOFF
BY
Brumbaugh, Free, Graves & Donohue
ATTORNEYS 3,327,054

PHOTOGRAPHIC VIDEO RECORDING SYSTEM HAVING SHUTTER BAR COMPENSATION

Kenneth B. Benson, South Norwalk, Conn., and Frank Davidoff, Lynbrook, N.Y., assignors to Columbia Broadcasting System, Inc., New York, N.Y., a corporation of New York Filed Oct. 25, 1963, Ser. No. 319,061
15 Claims. (Cl. 178—6.7)

This invention relates to the recording of video information and, more particularly, to the recording of video information on film to avoid undesirable "shutter-bar."

In the recording of video information on film according to standards prevailing in the United States and other countries, 60 fields (30 interlaced fields) of information are recorded each second in 24 frames on the film. The standard recording technique employs intermittent film movement 24 times a second, during which the film is blanked by a shutter and portions of selected video fields are unrecorded. As a result, certain film frames, specifically, the even numbered frames, include portions of different video fields. For example, the second film frame includes the second half of the third and the first half of the fifth video fields, while the fourth film frame includes the second half of the eighth and the first half of the tenth video fields. The junction between the half fields in even numbered frames on the film is termed the "splice." To avoid a visible splice, called shutter-bar, the shutter blanking the film during film movement must be properly synchronized with the moving film. It has been found, however, that even with perfect synchronization the film density is somewhat less than normal in the region of the film just above the splice. This region of low density is visible to the eye upon reproduction of the film, and results in a noticeable 12 cycle per second flicker in the top half of the projected or televised film recording.

This half frame density difference is described in Evans, Shutter-Bar in Television Film Recording, 70, Journal of the SMPTE 898 (November 1961), and is attributed to the fact that for all films optical density is not related by a constant to the product of illuminance and exposure time. The amount of the half frame density difference varies with the type of film and its processing. Films of higher speeds appear to be more susceptible to this density difference than do films of lower speed. In the present invention, this problem is overcome by modulating the video signal that is recorded so as to compensate for the film density difference and thus to eliminate the flicker disturbance during subsequent reproduction of the recording.

In accordance with the invention, the video signal is modulated during the half field recorded at the end of the even numbered film frames to increase the magnitude of the signal, thus to compensate for the lower film density. Advantageously, a modulating signal of non-linear sawtooth waveform is employed, which is generated in response to the vertical field drive pulses used to initiate the vertical scanning action in the cathode ray tube employed in the recording process and pulses derived from the shutter blanking the film during film movement.

The invention described above in general terms is explained more fully in the following detailed description, which is to be read in conjunction with the appended drawings, in which.

Figure 1:
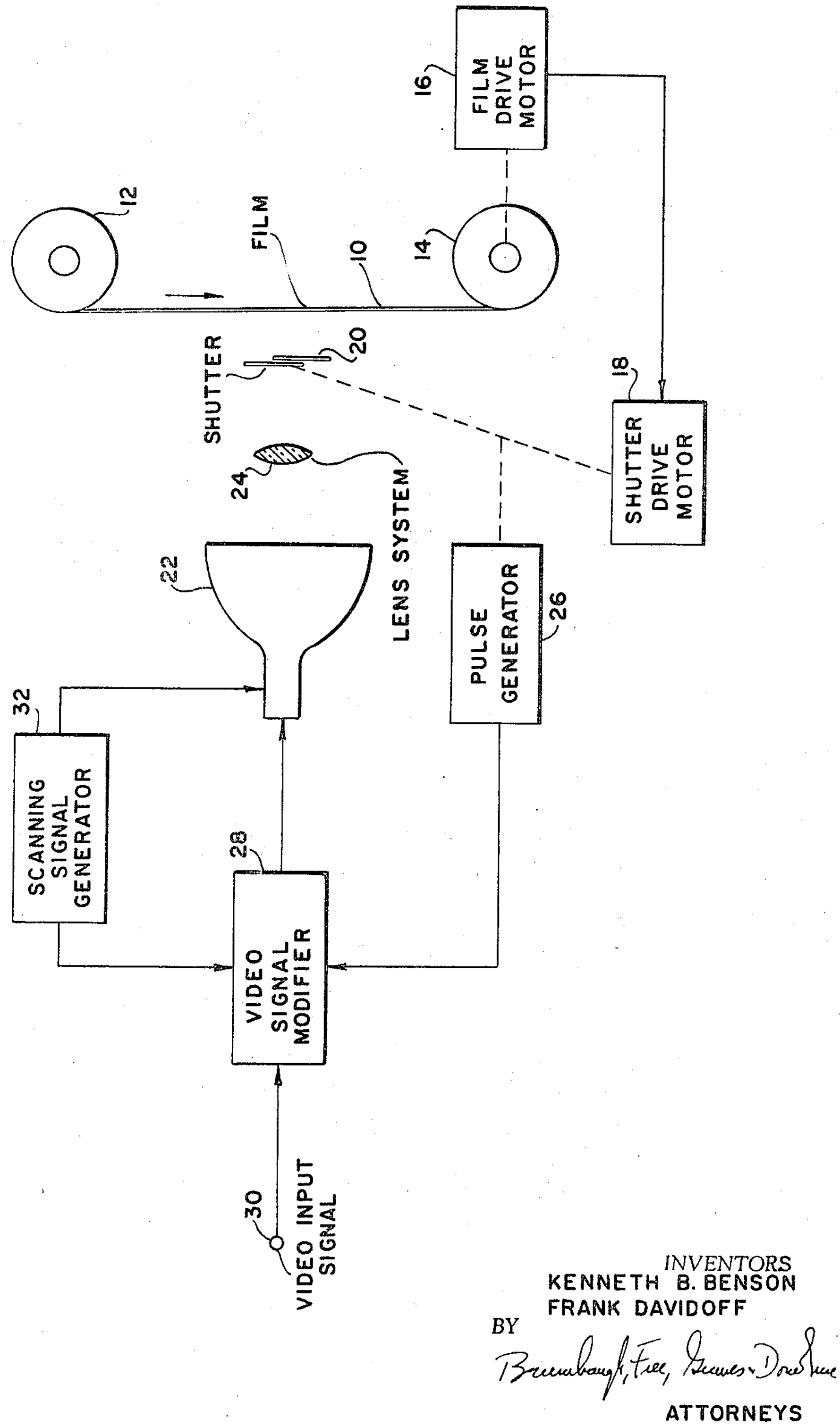
FIG. 1 is a block diagram of a representative system embodying the present invention.

The following Table 1 is helpful in understanding the present invention, and tabulates for ten consecutive video fields the fields and field portions during which recording film movement and blanking, and video signal modification occur. The table has been prepared on the basis of the video field rate and the film frame rate prevailing in the United States, i.e., 60 video fields (30 interlaced fields) per second and 24 film frames per second.

TABLE 1

| Video Fields | Recording | Film Movement and Blanking | Video Signal Modification |
|---|---|---|---|
| Fields 1 and 2 | Film Frame 1 | | |
| First half of Field 3 | | √ | |
| Second half of Field 3 | Film Frame 2 | | |
| Field 4 | Film Frame 2 | | |
| First half of Field 5 | Film Frame 2 | | √ |
| Second half of Field 5 | | √ | |
| Fields 6 and 7 | Film Frame 3 | | |
| First half of Field 8 | | √ | |
| Second half of Field 8 | Film Frame 4 | | |
| Field 9 | Film Frame 4 | | |
| First half of Field 10 | Film Frame 4 | | √ |
| Second half of Field 10 | | √ | |

It will be noted from Table 1 that video fields 1 and 2 are recorded on the film in frame 1. During the first half of viedo field 3, the film is moved to position it for recording on film frame 2, during which time the film is blanked. The second half of video field 3, all of video field 4, and the first half of video field 5 are recorded in film frame 2. During the second half of video field 5, the film is blanked and moved to position the third film frame for recording. All of video fields 6 and 7 are recorded in film frame 3. During the first half of video field 8, the film is blanked and moved to position the fourth film frame for recording. The second half of video field 8, all of video field 9, and the first half of video field 10 are recorded in film frame 4. During the second half of video field 10, the film is blanked and moved for recording on the next film frame.

As will be noted, the even numbered film frames are composed in part of portions of different video fields. Thus, film frame 2 includes the second half of video field 3, and the first half of video field 5. Film frame 4 includes the second half of video field 8 and the first half of video field 10.

It has been found that in each of the even numbered film frames the film density is lower than normal during the half field last recorded. From Table 1 it may be noted that such lower film density occurs during the first half of video field 5 in film frame 2 and in the first half of video field 10 in film frame 4. Accordingly, it is apparent that lower film density occurs during the recording of the first half of every fifth field. These half fields are all at the bottom of the corresponding film frames, and occur during the top half of the television picture display. To compensate for the lower film density, the present invention incorporates unique pulse generation and gating to select the first half of every fifth video field. During these half fields the video signal is modulated to increase its intensity, thereby to compensate for the lower film density that would normally occur.

Referring to FIG. 1, which shows a recording system in accordance with the invention, a film 10 upon which video information is to be recorded passes from a supply reel 12 to a takeup reel 14 driven by a drive motor 16. The drive motor moves the film intermittently, as indicated in Table 1, during the first half of video field 3, the second half of video field 5, the first half of video field 8, the second half of video field 10, and so on. During the time that the film is moved, a shutter drive motor 18 coupled to the motor 16 is energized. The motor 18 actuates a shutter 20 which blanks the film 10 and prevents video information, transmitted by a cathode ray tube 22 through a focusing lens system 24, from being recorded on the film. Frequently, an electronic shutter is used instead of a mechanical shutter. With an electronic shutter, the cathode-ray tube is turned off for appropriate times to prevent video information from reaching the film and being recorded.

The shutter drive motor 18 is also coupled to a pulse generator 26 which generates a pulse in timed relation to the blanking of the film by the shutter 20. The generated pulse is applied to a video signal modifier 28 which receives a video input signal from a terminal 30 and applies the signal to the cathode ray tube 22. A scanning signal generator 32 generates the scanning signals that are applied to the cathode ray tube 22 to cause the horizontal line and vertical field sweeps of the beam developed in the tube. Pulses from the scanning signal generator 32 causing the generation of the vertical field sweep are applied to the video signal modifier 28 which, in response also to the pulses generated by the pulse generator 26, causes the video input signal to be modified during the first half of every fifth video field in the cathode ray tube 22. Specifically, the video input signal is increased to compensate for the lower film density normally occurring in the film during these half fields.

Figure 2:
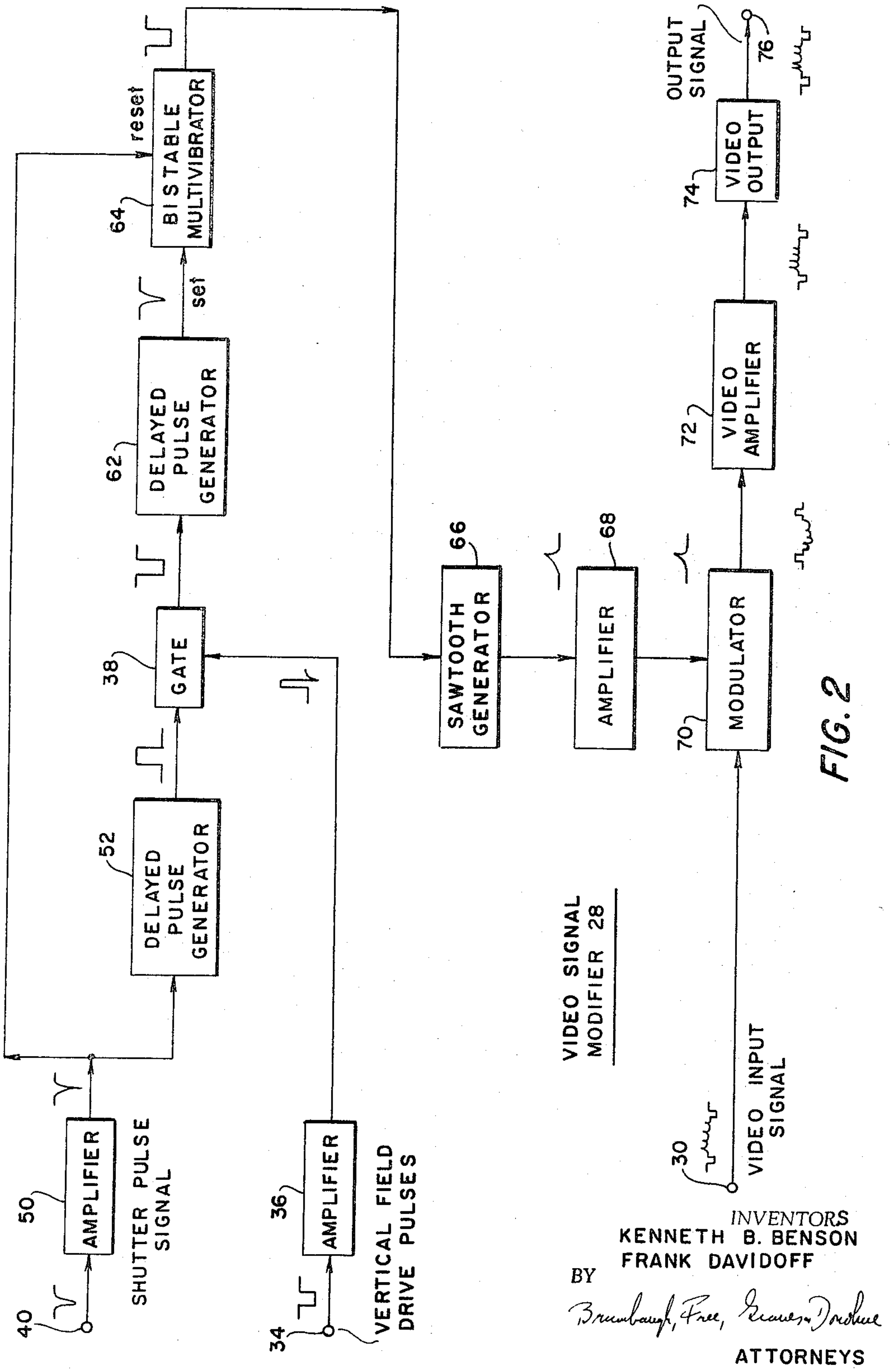
FIG. 2 is a block diagram of a circuit forming a part of the system of FIG. 1.

FIG. 2 shows a representative video signal modifier 28. Referring to that figure, vertical field drive pulses generated by the scanning signal generator 32 of FIG. 1 and appearing at an input terminal 34 are amplified in an amplifier 36 and applied as one input to a gate 38. Waveform 1 in FIG. 3 shows the timing of the vertical field drive pulses, which occur at the commencement of each video field.

Figure 4:
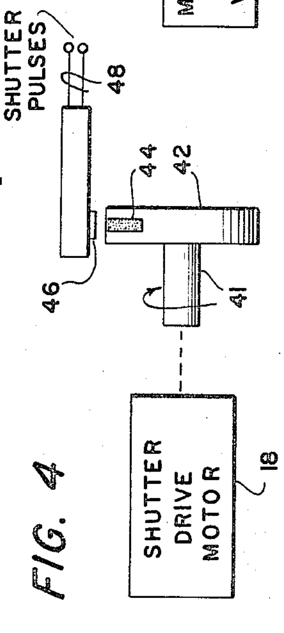
FIG. 4 is a diagram of a device for generating a pulse during the time that the film is blanked during the recording process.

Another input terminal 40 receives a shutter pulse signal from the pulse generator 26 of FIG. 1, a representative form of which is shown in detail in FIG. 4. Referring to that latter figure, the shutter drive motor 18 causes a shaft 41 containing a wheel 42 with a magnetic element 44 thereon to rotate. When the magnetic element 44 passes by a pick-up 46, a pulse is generated which appears at a pair of output conductors 48. Other means of generating pulses, such as detecting a beam of reflected light or mechanically operating contacts, may also be used for this purpose.

Figure 3:
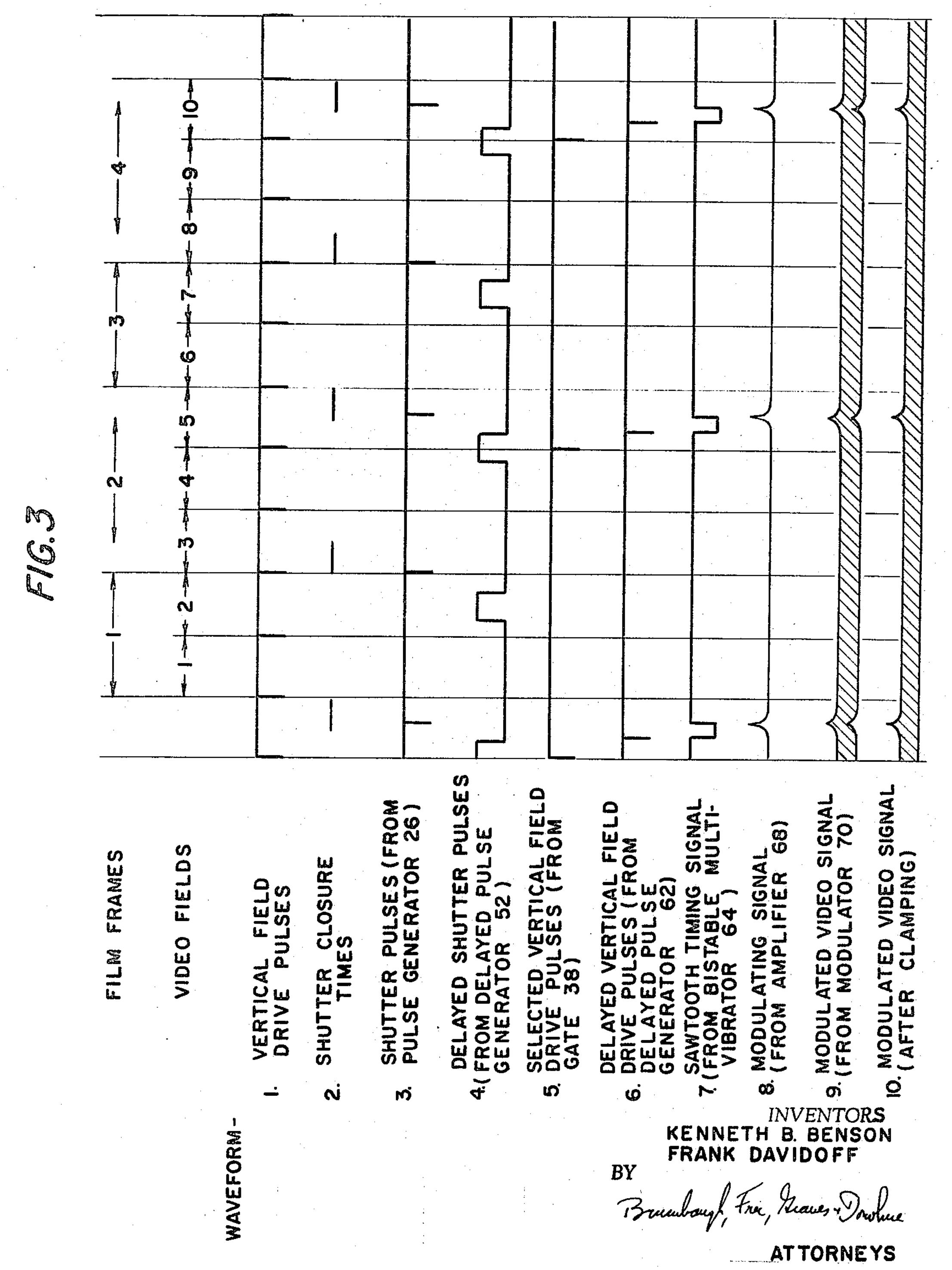
FIG. 3 is a series of waveform diagrams showing the relationships between signals generated by various components in the circuit of FIG. 2.

Waveform 2 of FIG. 3 shows the times of shutter closure, while waveform 3 shows the timing of the shutter pulse signals. It will be noted that shutter closure causing film blanking during film movement occurs during the first half of video field 3, the second half of video field 5, the first half of video field 8, the second half of video field 10, and so on, as indicated also in Table 1. Each shutter pulse occurs shortly after shutter closure. The phase of the shutter pulse with respect to shutter closure may be adjusted by changing the angular position of the wheel 42 on the shaft 41 in FIG. 4.

Figure 5:
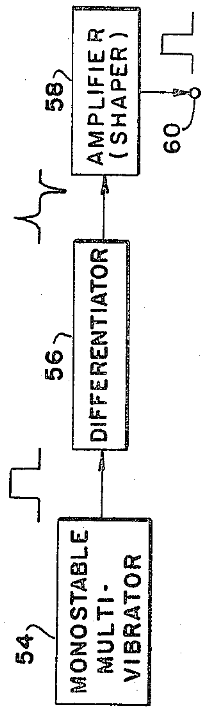
FIG. 5 is a block diagram of a portion of the circuit of FIG. 2.

Referring again to FIG. 2, the shutter pulse signals at the terminal 40 are applied to an amplifier 50 and then to a delayed pulse generator 52. A representative form of the generator 52 is shown in FIG. 5, and comprises a monostable multivibrator 54 which is triggered into conduction by each of the pulses from the amplifier 50 of FIG. 2 to generate a square wave signal that is applied to a differentiator 56. The differentiator 56 generates a positive pulse followed by a negative pulse. The time difference between the positive and negative pulses is determined by the length of time that the monostable multivibrator 54 remains in conduction. The negative pulse from the differentiator 56 cuts off an amplifier (shaper) 58 coupled to the differentiator, thereby to generate an output pulse at a terminal 60.

It will be noted that the delayed pulse generator 52 generates a pulse which occurs at a predetermined time after the occurrence of the shutter pulse signal. These delayed shutter pulses are shown in waveform 4 of FIG. 3, and last for approximately one-half a video field. For example, the delayed shutter pulse generated during the latter half of video field 4 continues into the first half of video field 5 and is occasioned by the shutter pulse in waveform 3 occurring just after the commencement of video field 3.

Referring again to FIG. 2, pulses from the delayed pulse generator 52 are applied to the gate 38. The gate 38 generates an output pulse when the input pulses applied to the gate occur at the same time. From waveforms 1 and 4 of FIG. 3, which show the input pulses applied to the gate 38, coincidence occurs between these pulses at the commencement of video fields 5 and 10. Thus, by proper timing of the pulses generated by the delayed pulse generator 52, this coincidence is caused to occur at the commencement of every fifth video field, which, as noted above, is the field during which signal modification is to take place.

The pulse signal from the gate 38, shown in waveform 5 of FIG. 3, is applied to a delayed pulse generator 62 which may consist of a monostable multivibrator and an accompanying differentiator, the same as the components 54 and 56 shown in FIG. 5, thus to generate a positive pulse followed by a negative pulse after the commencement of every fifth video field. By adjusting the time constant of the monostable multivibrator, the negative pulse may be caused to occur at any time following the commencement of every fifth video field.

The negative pulse generated by the delayed pulse generator 62, shown in waveform 6 of FIG. 3, is applied to a bistable multivibrator 64 to set the multivibrator. The multivibrator is reset by the pulses from the amplifier 50, which are the amplified shutter pulse signals. The multivibrator thus generates an output pulse, as shown in waveform 7 of FIG. 3, which commences at a time, which is adjustable, in the first half of every fifth video field, and which ends at the commencement of the second half of the video field when shutter closure and film movement occur. This time is that portion of the first half of every fifth video field recorded adjacent the splice between the half fields in the film frame during which the video signal is to be modified to increase its intensity, thus to compensate for the lower film density occurring adjacent the splice.

It is desirable to reset the bistable multivibrator 64 in response to the occurrence of the shutter pulse signal so that the termination of the pulse generated by the multivibrator conforms to the blanking of the film by the shutter. When the shutter timing is varied, as by varying the angular position of the wheel 42 on the shaft 41 of FIG. 4, there is no danger of the pulse signal from the multivibrator, which is used for video signal modulation as explained later, from terminating before the shutter closes. It is also desirable to terminate the pulse generated by the multivibrator shortly after shutter closure to permit all circuits to regain steady state conditions before the shutter reopens.

The output pulse from the multivibrator 64 is applied to a sawtooth generator 66 which generates a signal of sawtooth waveform for the duration of the pulse from the multivibrator. The sawtooth signal is amplified in an amplifier 68 which typically has a nonlinear characteristic so that the output signal from the amplifier is a sawtooth signal of nonlinear waveform. This signal, shown in waveform 8 in FIG. 3, is applied to a modulator 70 which receives the video input signal from the terminal 30. The modulator 70 increases the intensity of the video input signal, as shown in waveform 9 in FIG. 3, to compensate for the lower film density occurring during this video field in the film frame. In this regard, it has been found that a modulating signal of nonlinear waveform provides better compensation for the density variation of the film than does a linear sawtooth signal.

The signal from the modulator 70 is applied to a video amplifier 72 for amplification and thence to a video output stage 74 for further amplification without inversion. The signal from the video output stage appears at a terminal 76 which is coupled to the cathode ray tube 22 of FIG. 1. This output signal is represented by waveform 10 of FIG. 3, and is the same as the signal of waveform 9 after clamping during amplification so that the base of the video signal remains constant at ground or some other reference level.

Figure 6:
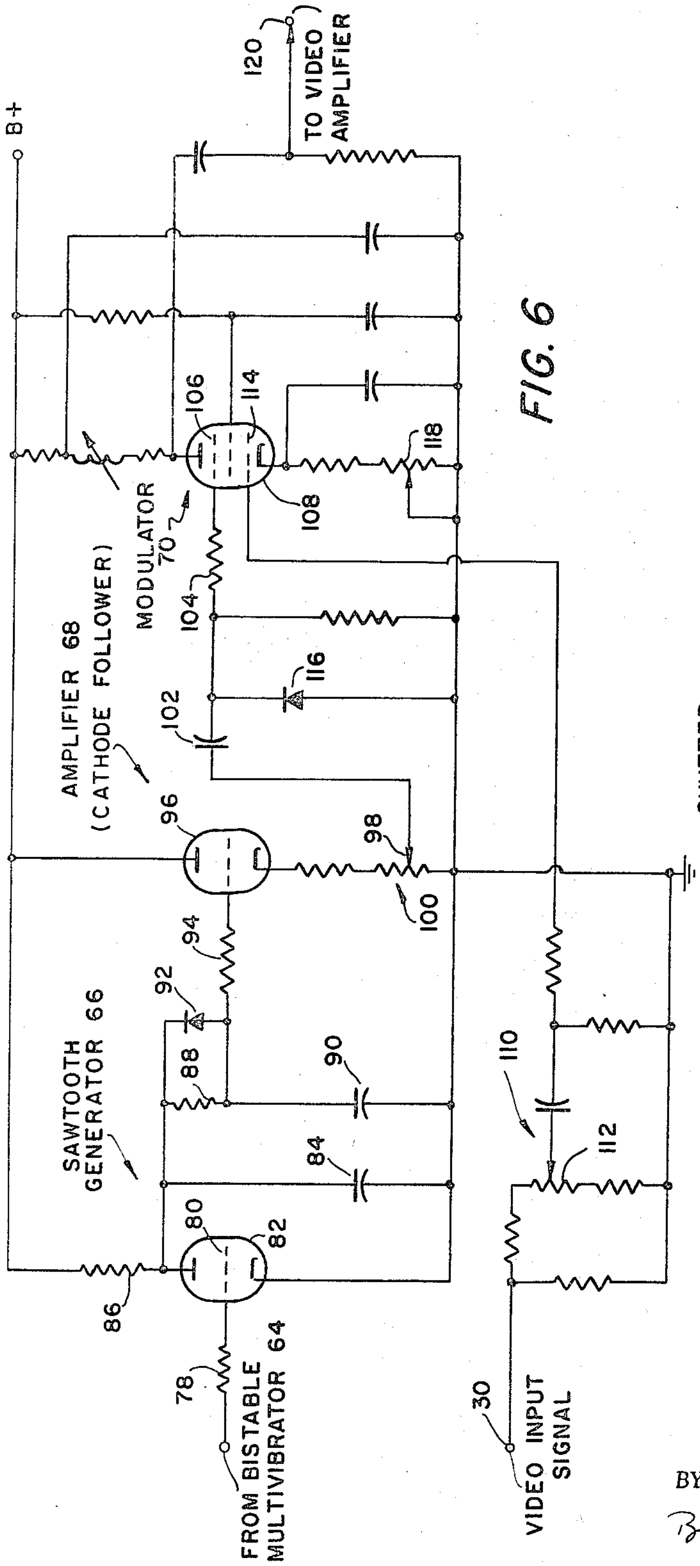
FIG. 6 is a schematic circuit diagram of a portion of the circuit of FIG. 2.

FIG. 6 shows a detailed schematic circuit diagram of representative forms of the sawtooth generator 66, the amplifier 68, and the modulator 70 of FIG. 2. Referring to FIG. 6, the pulse signal from the bistable multivibrator 64 is coupled through a resistor 78 to grid 80 of tube 82. When the pulse from the multivibrator occurs, the tube 82 is cut off, thereby allowing a capacitor 84 to charge through a resistor 86 that is coupled to a suitable source of bias potential indicated by the symbol B+. The circuit constants are chosen so that a linear sawtooth potential is developed across the capacitor 84.

A non-linear sawtooth signal in obtained by applying the linear sawtooth signal developed across the capacitor 84 to an integration network comprising a resistor 88 and a capacitor 90. A diode 92, typically silicon, is coupled across the resistor 88 to provide a relatively short discharge time, thereby allowing the circuit to regain quickly its steady state condition. It will be noted that for the diode polarity shown, the diode shunts the resistor 88, permitting rapid discharge of the capacitor 90, when the tube 82 is conducting.

The non-linear sawtooth signal is applied through a resistor 94 to a tube 96 which forms part of a cathode follower amplification stage. The output signal from this stage appears at contact 98 of a potentiometer 100, which permits the magnitiude of the signal to be easily adjusted. The signal from the potentiometer is applied through coupling capacitor 102 and resistor 104 to a control grid 106 of tube 108.

The video input signal from the terminal 30 is applied through a resistor capacitor network 110, which includes a potentiometer 112, to grid 114 of tube 108. The tube 108 serves as a typical shunt peaked video amplifier, except for the modulation produced by the non-linear sawtooth signal applied to the grid 106. This permits the video signal to be increased by a substantial amount with little distortion to correct for lower film density. A diode 116 serves as a simple clamp to render the video gain constant during times of non-modulation. The potentiometer 112 adjusts the video gain of the circuit. A further potentiometer 118 serves as a linearity control to correct for variations in the tube 108. The output signal appears at an output terminal 120 which is coupled to the video amplifier 72 of FIG. 2.

It will be noted that the invention involves the modification of a video signal for recording on film at those times when necessary to compensate for film density variations from normal. It will be appreciated that the embodiment shown in the drawings and described above is susceptible of modification. Accordingly, the scope of the invention should not be taken to be restricted to this particular embodiment, but is to be determined solely by reference to the following claims which define the invention.

We claim:

1. In apparatus for recording from a video signal successive fields of video information on a film record in successive frames on the record, wherein certain frames include portions of different fields of information that are positioned adjacent each other to form a splice, the combination for compensating for shutter-bar at said splice, comprising means for generating a correction signal representative of the difference between desired and uncorrected film densities at said splice, and means for modulating the video signal during selected ones of said different fields in accordance with said correction signal.

2. Apparatus as recited in claim 1, wherein the modulating means modulates the video signal during the last field portion recorded in each of said certain frames.

3. Apparatus as recited in claim 1, wherein said certain frames each include a first half of a first field and a second half of a second field, and wherein the modulating means modulates the video signal during only one of said halves of said first and second fields.

4. Apparatus as recited in claim 3, wherein said modulating means generates a signal of sawtooth waveform.

5. Apparatus as recited in claim 3, wherein said modulating means generates a signal of nonlinear sawtooth waveform.

6. Apparatus as recited in claim 3, wherein said modulating means modulates the video signal during the half field that is last recorded in each of said certain frames.

7. In apparatus for recording from a video signal successive fields of information on a film record in successive frames on the record, wherein every other frame has recorded therein the latter half of a field and subsequently the beginning half of another field, said half fields abutting each other in the frame, the combination for compensating for film density variations in the portion of every other frame wherein said beginning half of another field is recorded, comprising means for generating a timing signal during said beginning half of another field in every other frame, and means responsive to said timing signal for modulating said video signal to compensate for said film density variations.

8. Apparatus as recited in claim 7, wherein said timing signal is generated during the latter portion of said beginning half of another field so as to compensate for said film density variations in the part of said frame wherein said half fields abut each other.

9. Apparatus as recited in claim 8, wherein said means for modulating said video signal selectively increases the intensity of said signal.

10. In apparatus for recording information from a video signal in a series of frames on a film record, the video information being transmitted in a series of successive fields occurring at a predetermined rate, wherein the film record is periodically moved so that the recording of information is transferred from one frame to another, and wherein blanking means are included for preventing the recording of information during the movement of the film record, thereby resulting in portions only of certain fields of video information being recorded, said portions being recorded in adjacent relation to form a splice; the combination for compensating for shutter-bar at said splice comprising: means for generating a modulating signal during selected fields, said modulating signal being representative of the difference between desired and uncorrected film densities at said splice, and means for modulating said video signal in accordance with said modulating signal, thereby to compensate for said shutter-bar.

11. Apparatus as recited in claim 10, wherein every other frame on the film record has recorded therein different halves of different video fields, and including means for generating said modulating signal during the half field last recorded in every other frame.

12. Apparatus as recited in claim 11, including means for generating a timing signal during said half field last recorded in every other frame, said means for generating said modulating signal being responsive to said timing signal.

13. Apparatus as recited in claim 12, wherein the video signal is accompanied by a first signal occurring at the commencement of each video field, and wherein said means for generating said timing signal comprises means for generating a second signal when said blanking means prevents the recording of information on the film record, means responsive to said second signal for generating a third signal occurring at a predetermined time after said second signal, means responsive to a coincidence between said first and third signals for generating a fourth signal occurring at the commencement of said half field last recorded in every other frame, and means responsive to said fourth signal for generating a fifth signal occurring at a predetermined time after said fourth signal, said fifth signal thereby occurring at a seletced time during said half field last recorded in every other frame and comprising said timing signal used to initiate the generation of said modulating signal.

14. Apparatus as recited in claim 13, wherein said means for generating said fifth signal generates a pulse signal commencing at a predetermined time after the occurrence of said fourth signal and terminating when said blanking means next prevents the recording of information on the film record.

15. Apparatus as recited in claim 13, wherein said means for generating said third signal comprises a monostable multivibrator triggered into conduction when said blanking means prevents the recording of information on the film record, the period of conduction of said monostable multivibrator being selectively variable, and means responsive to the termination of conduction of said monostable multivibrator for generating an output signal which comprises said third signal.

References Cited

UNITED STATES PATENTS 2,763,833 9/1956 Brumbaugh --------- 178—6.7

DAVID G. REDINBAUGH, *Primary Examiner.*

H. W. BRITTON, *Assistant Examiner.*